(12) United States Patent
Saint-Hilaire et al.

(10) Patent No.: US 7,577,451 B2
(45) Date of Patent: Aug. 18, 2009

(54) EXTENDING PERSONAL AREA NETWORKS

(75) Inventors: Ylian Saint-Hilaire, Hillsboro, OR (US); James Edwards, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 09/826,251

(22) Filed: Apr. 4, 2001

(65) Prior Publication Data

US 2002/0146981 A1 Oct. 10, 2002

(51) Int. Cl.
*H04W 4/00* (2009.01)
*H04B 7/00* (2006.01)

(52) U.S. Cl. ................... 455/465; 455/462; 455/552.1

(58) Field of Classification Search ............. 455/41.1, 455/41.2, 41.3, 7, 11.1, 14, 462, 465, 422.1, 455/448, 444, 39, 552.1, 557
See application file for complete search history.

(56) References Cited

U.S. PATENT DOCUMENTS

| | | | |
|---|---|---|---|
| 5,321,736 A * | 6/1994 | Beasley ..................... 455/11.1 |
| 5,603,080 A * | 2/1997 | Kallander et al. ............ 455/14 |
| 5,896,375 A * | 4/1999 | Dent et al. .................. 370/347 |
| 6,014,546 A * | 1/2000 | Georges et al. ............... 725/79 |
| 6,026,297 A * | 2/2000 | Haartsen .................. 455/426.1 |
| 6,289,213 B1 * | 9/2001 | Flint et al. .................. 455/420 |
| 6,571,103 B1 * | 5/2003 | Novakov .................... 455/41.2 |
| 6,590,928 B1 * | 7/2003 | Haartsen ..................... 375/134 |
| 6,622,018 B1 * | 9/2003 | Erekson ...................... 455/420 |
| 6,650,871 B1 * | 11/2003 | Cannon et al. .............. 455/41.2 |
| 7,363,006 B2 * | 4/2008 | Mooney ..................... 455/41.3 |
| 7,496,065 B2 * | 2/2009 | Anjum et al. ................ 370/328 |
| 2001/0002912 A1 * | 6/2001 | Tony et al. .................. 370/487 |
| 2002/0025780 A1 * | 2/2002 | Jakobsson et al. ............. 455/41 |
| 2002/0044549 A1 * | 4/2002 | Johansson et al. ........... 370/386 |
| 2002/0061009 A1 * | 5/2002 | Sorensen .................... 370/351 |
| 2002/0090961 A1 * | 7/2002 | Walley et al. ................ 455/462 |

(Continued)

FOREIGN PATENT DOCUMENTS

WO WO 9817032 A1 * 4/1998

(Continued)

OTHER PUBLICATIONS

Bhagwat et al., *BlueSky: A Cordless Networking Solution For Palmtop Computers*, Mobicom '99 Proceedings of the 5th Annual ACM/IEEE Intl. Conference on mobile Computer and Networking, Seattle, WA, Aug. 15-20, 1999, vol. Conf. 5, pp. 69-76.

(Continued)

*Primary Examiner*—Sonny Trinh
(74) *Attorney, Agent, or Firm*—Trop, Pruner & Hu, P.C.

(57) ABSTRACT

A pair of shorter range radio frequency networks may be linked together using a longer range communication protocol that is not based on the same radio frequency protocol utilized by the shorter range radio frequency networks. Enumeration data from one of the shorter range networks may be exchanged over a longer range network to combine the two shorter range networks using proxy devices such as cellular telephones. This may allow devices in a shorter range network to communicate over a longer range.

19 Claims, 4 Drawing Sheets

U.S. PATENT DOCUMENTS

2002/0142721 A1* 10/2002 Souissi et al. ................. 455/41
2002/0156861 A1* 10/2002 Pierce ........................ 709/217
2002/0160820 A1* 10/2002 Winkler ..................... 455/568

FOREIGN PATENT DOCUMENTS

| WO | WO 99/65204 | 12/1999 |
| WO | WO 01/03371 | 1/2001 |
| WO | WO 01/13660 | 2/2001 |

OTHER PUBLICATIONS

Albrecht et al., *IP Services over Bluetooth: Leading the Way to a New Mobility*; Local Computer Networks, LCN, 1999, Conference on Lowell, MA, Oct. 18-20, 1999, Los Almitos, CA, USA, IEEE Comput. Soc., Oct. 18, 1999, pp. 2-11.

* cited by examiner

EXTENDING PERSONAL AREA NETWORKS

BACKGROUND

This invention relates generally to radio frequency networks in which a plurality of devices communicate with one another using radio frequency signals.

A piconet is radio frequency network in which a plurality of devices communicate over an established protocol. One such an established protocol is the Bluetooth specification. See for example, revision b of the Bluetooth specification dated Jul. 2, 1998. The Bluetooth technology is a short range, cable replacement radio technology using the 2.4 GHz Industrial Scientific and Medical (ISM) band. Generally, the range of the existing Bluetooth devices is about 10 meters.

In a Bluetooth network, all units are peer units using essentially identical radios except for a unique 48 bit address. At the start of a connection, an initializing unit is temporarily assigned as a master. That assignment is valid only during that connection. The master initiates the connection and controls the traffic of up to seven slave units.

Units then may be dynamically connected to the piconet at any time. A connection is made either by a page message issued by a master, if an address is already known, or by an inquiry message followed by a subsequent page message if the address is unknown. In the initial page mode, the master sends a train of sixteen identical page messages on sixteen different hop frequencies defined for the slave unit being paged. The train covers half the sequence of frequencies in which the slave can wake-up and is repeated 128 times. If no response is received, the master transmits a train of sixteen identical page messages on the remaining sixteen hop frequencies in the wake-up sequence. The maximum delay before the master reaches the slave may be 2.5 seconds.

Inquiry messages are very similar to the page message but may require one additional train to collect all the responses. If no data needs to be transmitted, the piconet units may be put on hold where only an internal timer is running. When the units go out of the hold state, data transfer can be restarted instantaneously. The units may thereby remain connected, without data transfer, in a low power state. Data may be exchanged over synchronous connection oriented (SCO) links or asynchronous connectionless (ACL) links.

A personal area network is a network that may be established using Bluetooth technology, for example, between a master and a plurality of proximate slave devices. A personal area network generally involves a piconet wherein a plurality of devices commonly owned by one person are able to communicate with one another without using cables.

Thus, personal area networking is generally limited to the connection between proximate devices. In the case of Bluetooth-style piconet, that means that all of the devices in the piconet are within ten meters of one another.

However, in a variety of different circumstances any one user may have devices that the user wishes to communicate with that are spaced much farther than ten meters apart. For example, a user may have a home computer and a computer at work that are more than ten meters apart. Because of the range limitations of conventional cable replacement radio frequency protocols, communications between such remote devices in different piconets is currently not possible. Each of the piconets, set-up on an ad hoc basis, is effectively isolated in a local ten meter region.

Thus, there is a need for a way to enable piconets to communicate with one another at distances greater than the range of the particular radio frequency protocol utilized to establish the piconet.

DETAILED DESCRIPTION

Figure 1:
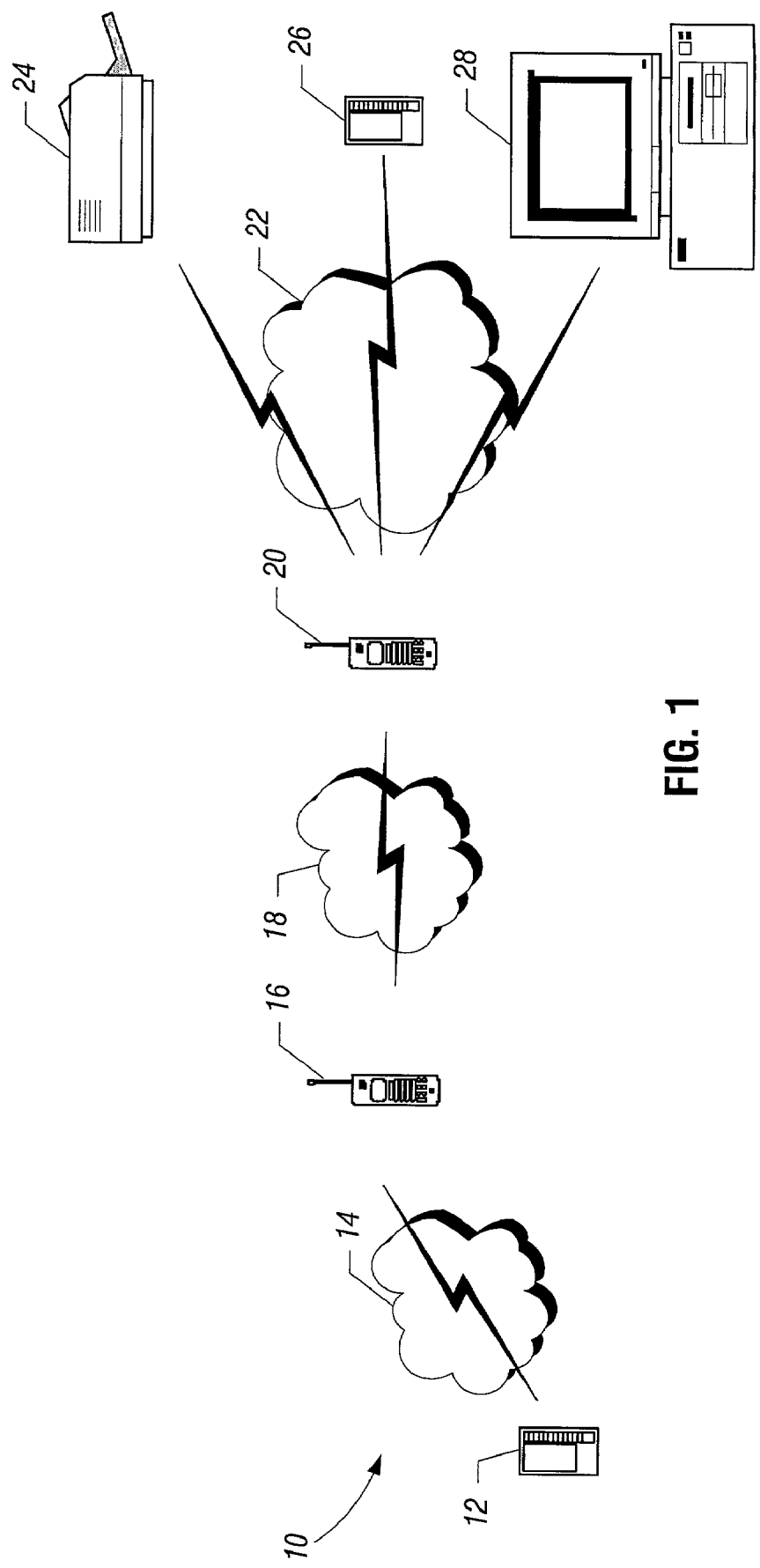
FIG. 1 is a schematic depiction of one embodiment of the present invention.

Referring to FIG. 1, a pair of telephones 16 and 20 may be connected over a telephone network 18 in one embodiment of the present invention. In one embodiment, each telephone 16 or 20 communicates using digitized or packetized data such as that associated with the digital personal communication services (PCS) network as one example. In other cases, conventional telephones may be utilized. In one implementation, each telephone 16 and 20 may be a cellular telephone.

Each telephone 16 may also be compliant with a radio frequency communication protocol such as the Bluetooth protocol. Thus, each telephone 16 or 20 may be a member of a proximate, local personal area network (PAN). In the case of the telephone 16, its personal area network or piconet 14 may include a personal digital assistant (PDA) 12 as one example. Thus, the piconet 14 may include a master which may be the PDA 12 or the telephone 16.

Similarly, the telephone 20 may be in its own piconet 22 that may include, in this example, a printer 24, a personal digital assistant (PDA) 26 and a personal computer 28. In this case, as one example, the telephone 20 may be the master of the piconet 22. The piconets 14 and 22 may both be Bluetooth protocol piconets or any other radio frequency protocol network.

Conventionally, the PDA 12 cannot communicate with the PDA 26 because the distance between the piconets 14 and 22 is greater than the range of the radio frequency protocol that is utilized by each piconet 14 or 22. However, the devices 16 and 20 may communicate over a non-radio-frequency network such as the telephone network 18. That communication may involve a cellular telephone call to a base station connected over a conventional land line phone network (public switched telephone network (PSTN)) to another base station and then, by a cellular connection to the telephone 20, in one embodiment of the present invention.

However, each telephone 16 or 20 may receive enumeration information from all of the devices in its piconet 14 or 22. For example, using the Bluetooth protocol, an ad hoc piconet 14 is automatically established between proximate devices 16 and 12. Similarly, an ad hoc piconet 22 may be established that includes the telephone 20 and the devices 24, 26, and 28 as one example. A master in each piconet automatically develops enumeration data for the piconet that lists each device in the piconet, in one embodiment.

Thus, each telephone 16 and 20 may include the enumeration data for its piconet in one embodiment. This may be because the device 16 or 20 is the master of its piconet or, even if the telephone 16 or 20 is a slave in its piconet, the telephone 16 or 20 obtains the enumeration data for all the devices in its piconet 14 or 22. The enumeration data may include an address or identifier for each device. The enumeration data may or may not include specific information about what type of devices are in the piconet 14 or 22.

When a cellular telephone communication occurs between the devices 16 and 20, digital packets may be generated by each telephone 16 and 20 and transferred over the telephone network 18 in one embodiment. Each telephone 16 or 20 may automatically append, to packetized voice data, enumeration data about the devices in a proximate piconet 14 or 22 as the case may be. This enumeration data may be transferred as a burst transmission in one embodiment. As other embodiments, the enumeration data is transferred at different times when possible or the enumeration may be transferred progressively, appending piconet enumeration data to successive packets of voice data.

In one embodiment, each telephone 16 or 20 acts a proxy for the remaining devices in its piconet 14 or 22. If such case, the piconets 14 and 22 may be temporarily combined into a single piconet that includes all of the devices in the piconet 22, for example, plus the device 16 that acts as a proxy for the device 12, as one example. Alternatively, the combined piconet may include the devices 12 and 16 in the piconet 14 together with the device 20, which acts as a proxy for the remaining devices in the piconet 22.

As one example, the telephone 16, which initiates the call to the other telephone, may automatically be established as the master for the combined piconet and the receiving telephone such as the telephone 20, may then become a slave. However, other protocols may be utilized to established a combined piconet.

As a result, during the course of a telephone conversation, for example ongoing between the telephone 16 and 20, data may also be exchanged between the PDA 12 and any of the devices 24 through 28. This may occur seamlessly, without being noticed by the telephone conversants, in one embodiment of the present invention.

Figure 2:
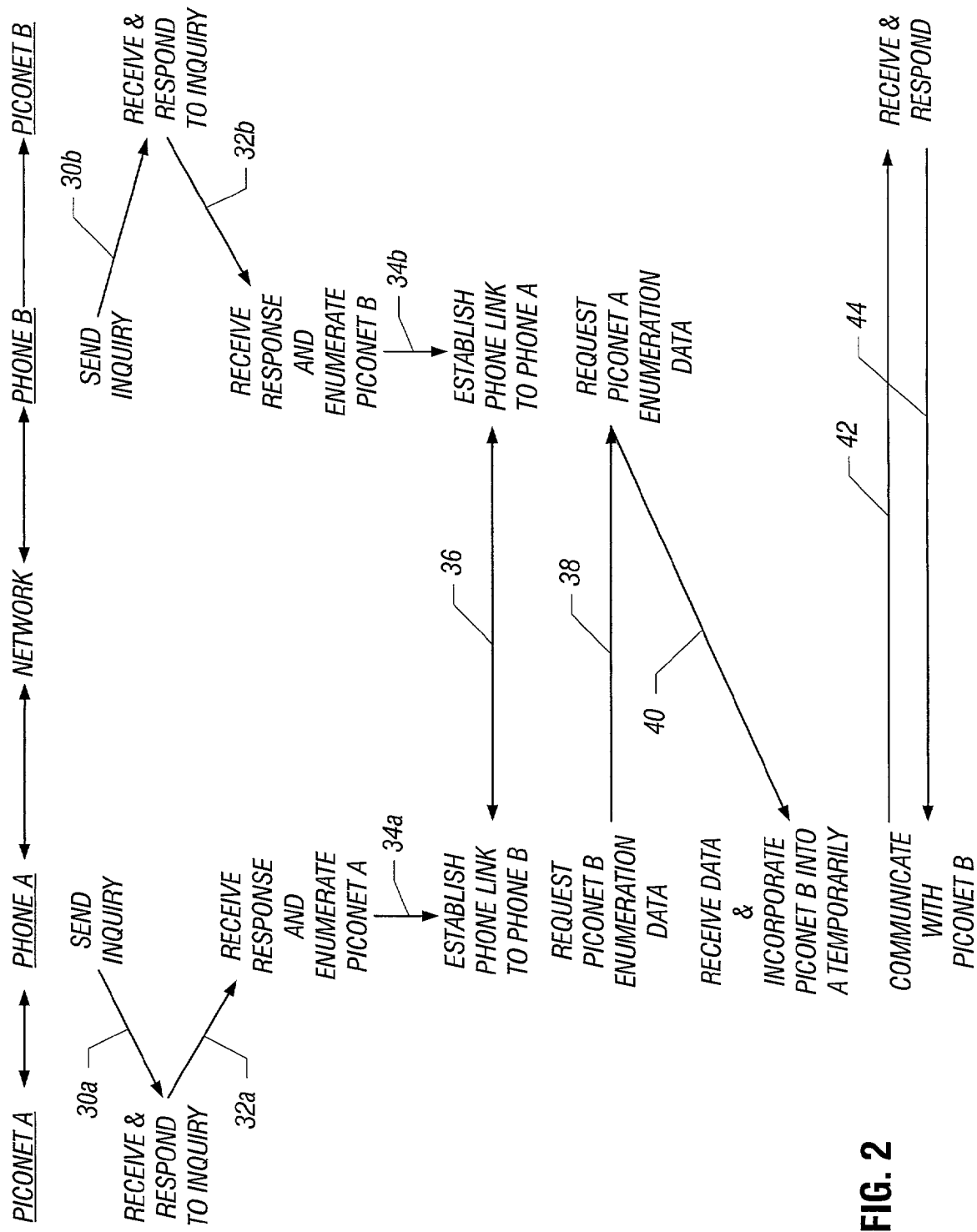
FIG. 2 is a data flow diagram of one embodiment of the present invention.

Referring to FIG. 2, the piconet A may be, for example, the piconet 14 and the telephone A may be, for example, the telephone 16. The telephone A then sends an inquiry to the piconet A as indicated at 30a. Any devices in piconet A receive and respond to the inquiry as indicated at 32a. In such case, the telephone A may be established as the master of the piconet A. The telephone A then receives the response and enumerates piconet A. The information about piconet A is then stored in a memory associated with telephone A.

At the same time, the same or similar steps may be implemented by telephone B (such as the telephone 20) and the piconet B, such as the piconet 22, as indicated by the arrows 30b and 32b. At this point, the telephone A then establishes a telephone network 18 connection to telephone B as indicated at 36. This corresponds to the user making a telephone call from the telephone 16 over the network 18 to the telephone 20.

The telephone A may then either request piconet B enumeration data (developed at 32b) or may receive the data automatically. In the illustrated embodiment, a request 38 is made to telephone B and the telephone B responds with the enumeration data as indicated at 40. In such case, the telephone A becomes the master and appropriates piconet B into piconet A.

In one embodiment, the telephone A may likewise provide piconet A enumeration data to the telephone B or to some other device in the piconet B as indicated at 42. The proxy for piconet B, namely the telephone B, then responds, indicating that it has received the enumeration data. At that point, the telephone A may establish communications with any device in piconet B or piconet A as if all the devices were in the same piconet. Thus, any device in piconet A may communicate with any device in piconet B at the same time a telephone conversation is going on between the users of the telephones A and B.

Figure 3:
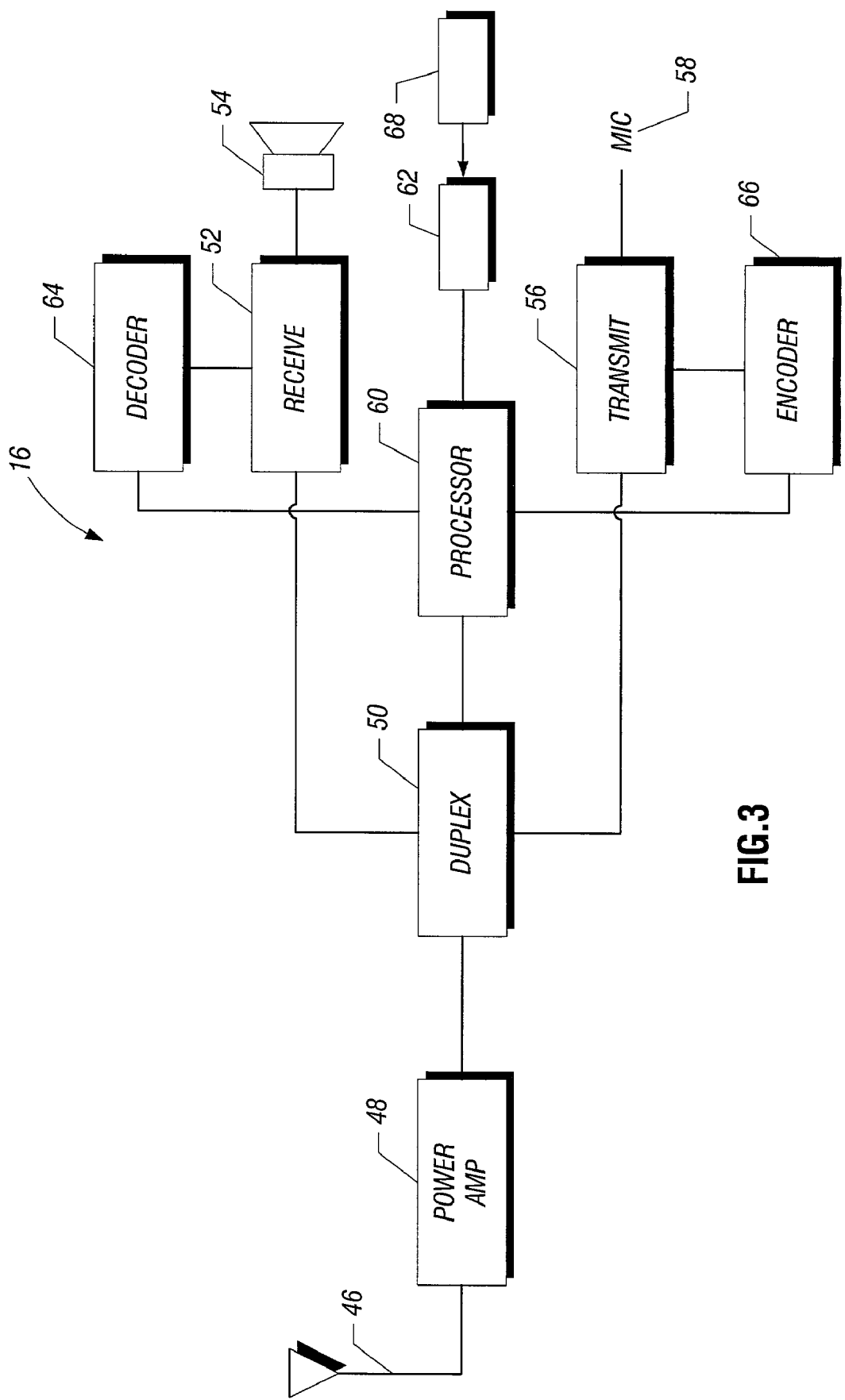
FIG. 3 is a block diagram of hardware for implementing a device in accordance with one embodiment of the present invention.

Referring to FIG. 3, one embodiment of a telephone 16 or 20 includes an antenna 46 and a power amplifier 48. The power amplifier 48 communicates with a duplexer 50 that is coupled to receive circuitry 52 and transmit circuitry 56. The transmit circuitry 56 may be coupled to a microphone 58 and likewise the receive circuitry 52 may be coupled to a speaker 54.

The receive circuitry 52 may be coupled to a decoder 64 that decodes any packets that are received. These packets may be voice packets or data packets including either enumeration data or data destined for a particular device in a particular piconet. The decoder 64 communicates with a processor 60. The processor 60, in one embodiment, may be a microcontroller. The processor 60 may include a memory 62 that in one embodiment may be a flash memory. The memory 62 may store software 68 and enumeration data.

Similarly, the transmit circuitry 56 is coupled to an encoder 66 also coupled to the processor 60. The encoder encodes the data, such as voice data, enumeration data or data for enumerated devices in either piconet in an appropriate format to be recognized on the receiving end.

When the processor 60, for example, determines that data has been received which is not meant for the telephone 16 but rather is intended for another device in the piconet, the encoder 66 appropriately encodes that information and transmits it using the appropriate transmitter, such as a cellular phone transmitter or the Bluetooth transmitter in one example. Thus, the power amplifier 48 may be capable of selectively providing either a Bluetooth signal or a cellular radio signal in one embodiment of the present invention.

In accordance with one embodiment to the present invention, the software 68 may be responsible for establishing a non-radio frequency link between piconets that are not sufficiently proximate to one other to enable radio frequency communications according to a protocol such as the Bluetooth protocol. Initially, a link is established as indicated in block 70. The link may involve the actions indicated by arrows 30, 32, 34 and 36 in FIG. 2.

At diamond 72 a check determines whether a device in one piconet has a job for a device in another piconet. If so, remote enumeration data may be requested from the remote piconet as indicated in block 74. The remote device enumeration data may be received locally and incorporated into the local requesting piconet's enumeration data to develop an enlarged or combined piconet as indicated in block 76. The combined piconet may enable temporary inter-piconet communications during the time period when a telephone connection remains established.

Alternatively, the enumeration data may be exchanged automatically regardless of whether one device in one piconet has a job for a device in another piconet. After the enumeration data is exchanged, a device in one piconet may assign a job to a device in another piconet. In one embodiment some devices in a piconet may be marked so that they are not accessible to devices in another piconet.

A check at diamond 78 determines whether the telephone link is still active. If so, the flow may iterate. Otherwise, the remote devices may be removed from the local, requesting piconet as indicated in block 80.

Figure 4:
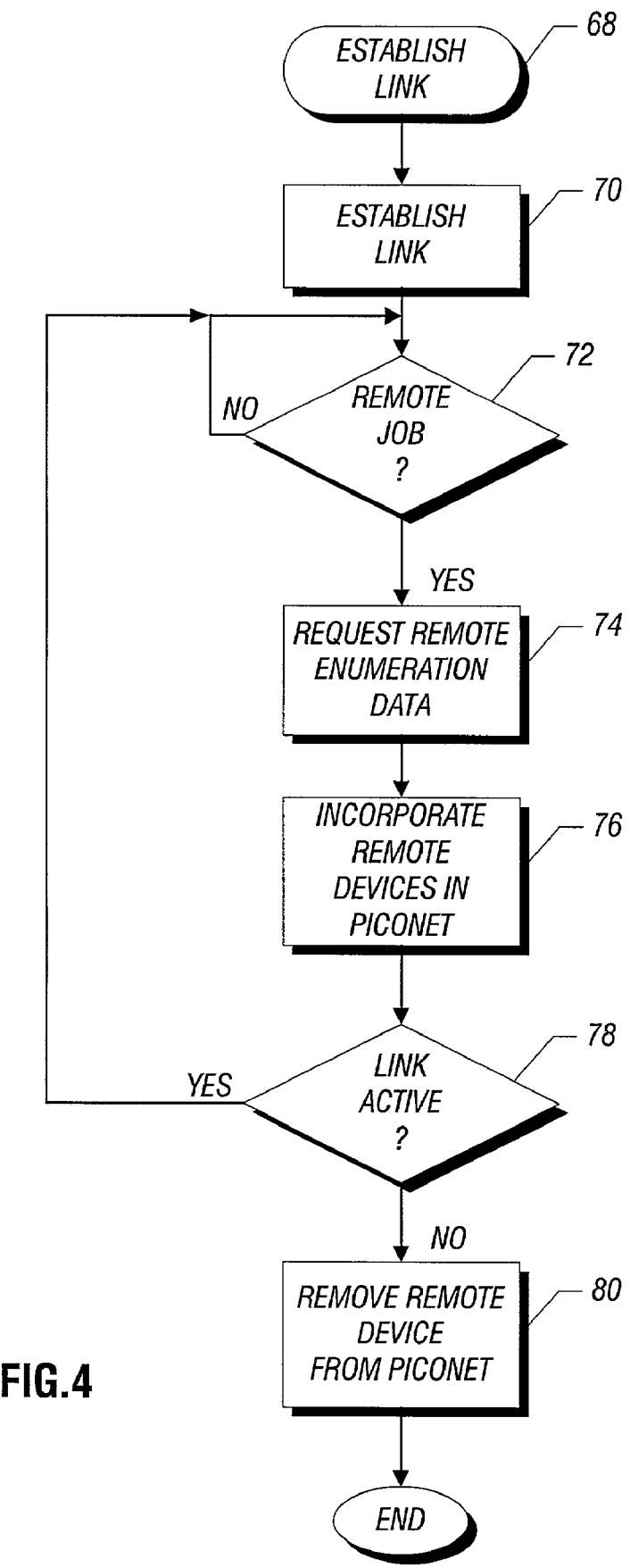
FIG. 4 is a flow chart which may be utilized by the device of FIG. 3 in accordance with one embodiment of the present invention.

While FIG. 4 illustrates an embodiment in which the links and enumeration data are handled within any given telephone, this information may also be off-loaded to a telephone network or telephone service provider. For example, a telephone service provider may recognize particular types of appended data. In response to the detection of that data, the telephone service provider may make decisions and provide instructions to remote telephones to implement the exchange of piconet enumeration data (or other data) between various devices on one or more piconets. This may reduce the processing requirements placed on any particular telephone 16 or 20 in one embodiment.

While an example is described using the Bluetooth protocol, other radio frequency protocols may be utilized as well including the IEEE 802.11 protocol. See 802.11-1997 Information Technology Specification available from the Institute of Electrical and Electronic Engineers, New York, N.Y. In addition, while a telephone network 18 is illustrated as the non-radio frequency network used to expand the piconets 14 and 22, other networks may be utilized as well including a local area network (LAN), a metropolitan area network (MAN) or the Internet, as additional examples. In each case, data from a shorter range, radio frequency network may be exchanged over a longer range, non-radio frequency network to extend the reach of devices in the shorter range, radio frequency network.

While an example has been described in which enumeration data may be packetized data and may be appended to packetized voice data, other forms of data communications may also be implemented. For example, enumeration data may be separately packetized and sent across a network. In some cases, the voice data and the enumeration data may travel over separate channels or by way of separate networks. In addition, other techniques may be utilized to transfer and encode the enumeration data. For example, the enumeration data may be converted into a high frequency audio signal that cannot be audibly perceived by humans and transferred over the telephone network 18 with other voice data. This information may then be decoded and utilized to expand one piconet across a remote access network to include another piconet.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    enabling a plurality of first wireless devices in a first wireless piconet to communicate using a first wireless protocol having a first range;
    enabling a plurality of second wireless devices in a second wireless piconet to communicate using a second wireless protocol having a second range;
    enabling the first and second wireless piconets to communicate with one another at a distance greater than the first or the second range;
    said first wireless piconet including a third device that communicates using said first wireless protocol and a third wireless protocol different from said first wireless protocol, said third wireless protocol having a range greater than said first and second ranges;
    said second wireless piconet including a fourth wireless device that communicates using said second wireless protocol and said third wireless protocol; and
    using said third and fourth wireless devices to forward communications between first and second wireless devices by automatically appending enumeration data on said communications.

2. The method of claim 1 including automatically enumerating a plurality of devices in a Bluetooth radio frequency network.

3. The method of claim 1 including communicating information about said first wireless piconet over a telephone network.

4. The method of claim 1 including enumerating a plurality of devices in a second wireless piconet.

5. The method of claim 4 including combining said first and second piconets into a combined radio frequency network.

6. The method of claim 5 including enabling any device in said first wireless piconet to communicate through a telephone call with any device in said second wireless piconet.

7. The method of claim 6 including transmitting data between said first and second wireless piconets through said telephone call at the same time that a voice communication is ongoing between a device in said first wireless piconet and a device in said second wireless piconet.

8. The method of claim 7 including enumerating a cellular telephone as said third and fourth devices.

9. The method of claim 8 wherein one of said cellular telephones acts as a proxy for the devices in said first wireless piconet and the other of said cellular telephones acts as a proxy for the devices in said second wireless piconet.

10. An article comprising a computer storage medium storing instructions that, if executed, enable a processor-based system to:
    enable a plurality of first wireless devices in a first wireless piconet to communicate using a first wireless protocol having a first range;
    enable a plurality of second wireless devices in a second wireless piconet to communicate using a second wireless protocol having a second range;
    enable the first and second wireless piconets to communicate with one another at a distance greater than the first or the second range;
    said first wireless piconet including a third wireless device that communicates using said first wireless protocol and a third wireless protocol different from said first wireless protocol, said third wireless protocol having a range greater than said first and second ranges;
    said second wireless piconet including a fourth wireless device that communicates using said second wireless protocol and said third wireless protocol; and
    use said third and fourth wireless devices to forward communications between first and second wireless devices by automatically appending enumeration data on said communications.

11. The article of claim 10 further storing instructions that enable the processor-based system to automatically enumerate a plurality of devices in a Bluetooth radio frequency network.

12. The article of claim 10 further storing instructions that enable the processor-based system to develop enumeration data for a plurality of devices in the first wireless piconet and communicate that enumeration data over a non-radio frequency network.

13. The article of claim 12 further storing instructions that enable the processor-based system to develop communications about said first wireless piconet over a telephone network.

14. The article of claim 10 further storing instructions that enable the processor-based system to receive enumeration data from a plurality of devices in a second wireless piconet coupled to said first wireless piconet by a non-radio frequency network.

15. The article of claim 14 further storing instructions that enable said processor-based system to combine said first and second wireless piconet enumeration data to develop a combined radio frequency network.

16. The article of claim 15 further storing instructions that enable the processor-based system to enable any device in said first wireless piconet to communicate with any device in said second radio frequency network.

17. The article of claim 16 further storing instructions that enable the processor-based system to transmit data from said first to said second wireless piconet via said call at the same time that a voice communication is ongoing between a device in said first wireless piconet and a device in said second wireless piconet.

18. The article of claim 17 further storing instructions that enable the processor-based system to implement cellular radio frequency communications.

19. The article of claim 18 further storing instructions that enable said third device which is a cellular telephone in said first wireless piconet to act as a proxy for other devices in said first wireless piconet.

* * * * *

UNITED STATES PATENT AND TRADEMARK OFFICE
CERTIFICATE OF CORRECTION

PATENT NO. : 7,577,451 B2 Page 1 of 1
APPLICATION NO. : 09/826251
DATED : August 18, 2009
INVENTOR(S) : Saint-Hilaire et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Seventh Day of September, 2010

David J. Kappos
*Director of the United States Patent and Trademark Office*